United States Patent
Yoon et al.

(10) Patent No.: US 10,700,937 B2
(45) Date of Patent: Jun. 30, 2020

(54) METHOD FOR SETTING LINK SPEED OF DUAL PORT SWITCH

(71) Applicant: LSIS CO., LTD., Gyeonggi-do (KR)

(72) Inventors: Geon Yoon, Gyeonggi-do (KR); Ji-Geon Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 147 days.

(21) Appl. No.: 15/802,502

(22) Filed: Nov. 3, 2017

(65) Prior Publication Data

US 2018/0176091 A1 Jun. 21, 2018

(30) Foreign Application Priority Data

Dec. 20, 2016 (KR) .................. 10-2016-0174348

(51) Int. Cl.
| | | |
|---|---|---|
| *H04L 12/24* | (2006.01) | |
| *H04L 5/14* | (2006.01) | |
| *H04L 12/26* | (2006.01) | |
| *H04L 12/937* | (2013.01) | |
| *H04L 12/931* | (2013.01) | |

(52) U.S. Cl.
CPC ........ *H04L 41/0896* (2013.01); *H04L 5/1446* (2013.01); *H04L 43/0888* (2013.01); *H04L 43/062* (2013.01); *H04L 49/253* (2013.01); *H04L 49/351* (2013.01); *Y02D 50/10* (2018.01)

(58) Field of Classification Search
CPC ............... H04L 41/0896; H04L 43/062; H04L 43/0888; H04L 49/253; H04L 49/351; H04L 5/1446; Y02D 50/10
See application file for complete search history.

(56) References Cited

U.S. PATENT DOCUMENTS

| | | | |
|---|---|---|---|
| 8,234,399 B2 | 7/2012 | Wood | |
| 2002/0118640 A1* | 8/2002 | Oberman | ................ H04L 49/25 370/230 |
| 2003/0221026 A1 | 11/2003 | Newman | |
| 2004/0257856 A1* | 12/2004 | Liu | ........................... G06F 5/10 365/154 |
| 2005/0036496 A1 | 2/2005 | Tang | |
| 2009/0303883 A1 | 12/2009 | Kucharczyk et al. | |
| 2011/0149970 A1 | 6/2011 | Jeong et al. | |
| 2012/0170591 A1 | 7/2012 | Diab et al. | |

(Continued)

FOREIGN PATENT DOCUMENTS

| | | |
|---|---|---|
| EP | 2717532 A2 | 4/2014 |
| JP | 2005223394 A | 8/2005 |
| JP | 2005278175 A | 10/2005 |

(Continued)

OTHER PUBLICATIONS

WO 98/30039 (Year: 1998).*
European Search Report for related European Application No. 17199695.2; report dated May 15, 2018; (9 pages).
Korean Office Action for related Korean Application No. 10-2016-0176348; action dated May 14, 2018; (2 pages).
Eric A. Udren; "IEEE (ANSI) Device No. 16—Ethernet Switches and Routers"; Annual Conference for IEEE; Apr. 1, 2008; pp. 247-272; XP031249257; (26 pages).

(Continued)

*Primary Examiner* — June Y Sison
(74) *Attorney, Agent, or Firm* — K&L Gates LLP

(57) ABSTRACT

The present disclosure relates to a method for setting a link speed of a dual port switch, and more particularly, to a method for setting a link speed of a dual port switch, which controls link speeds of ports, which are included in the dual port switch using a cut-through packet switching scheme, to be equal to each other.

4 Claims, 7 Drawing Sheets

(56) References Cited

U.S. PATENT DOCUMENTS

2014/0043974 A1* 2/2014 Kwan .................. H04L 47/22
                                                    370/230.1
2016/0028655 A1* 1/2016 Alsup .................. H04L 49/30
                                                    370/276

FOREIGN PATENT DOCUMENTS

| JP | 2006237797 A | 9/2006 |
| JP | 2010141426 A | 6/2010 |
| JP | 5495743 B2 | 5/2014 |
| JP | 5717254 B2 | 5/2015 |
| KR | 1020070023750 A | 2/2007 |

OTHER PUBLICATIONS

Japanese office Action for related Japanese Application No. 2017-216594; action dated Aug. 21, 2018; (6 pages).
Japanese Office Action for related Japanese Application No. 2017-216594; action dated Apr. 9, 2019; (5 pages).
Japanese Office Action for related Japanese Application No. 2017-216594; action dated Oct. 11, 2019; (6 pages).
Okagawa Kirokazu; "Practical Seminar for Router and Switch"; Network World, vol. 8, No. 1; Japan IDG Japan, Inc.; Jan. 2003; (15 pages).

* cited by examiner

PRIOR ART

PRIOR ART

PRIOR ART

METHOD FOR SETTING LINK SPEED OF DUAL PORT SWITCH

CROSS-REFERENCE TO RELATED APPLICATIONS

This application claims the benefit of Korean Patent Application No. 10-2016-0174348, filed on Dec. 20, 2016, entitled "METHOD FOR SETTING LINK SPEED OF DUAL PORT SWITCH", which is hereby incorporated by reference in its entirety into this application.

BACKGROUND

1. Technical Field

The present disclosure relates to a method for setting a link speed of a dual port switch, and more particularly, to a method for setting a link speed of a dual port switch, which controls link speeds of ports, which are included in the dual port switch using a cut-through packet switching scheme, to be equal to each other.

2. Description of the Related Art

A supervisory control and data acquisition (SCADA) system is a large-scale system that processes and monitors large amounts of data and provides various related functions. Particularly, the SCADA system is mainly applied to control of a large-scale process, and the real-time Ethernet may be constructed in such a SCADA system to control individual processes in real time.

To control the individual processes in real time, data should be transmitted within a predetermined time on the SCADA system. Recently, in order to implement such a real-time control, there is a tendency to construct the real-time Ethernet using a dual port switch based on a cut-through packet switching scheme.

FIG. 1 is a diagram illustrating a connection state of dual port switches used in the conventional Ethernet, and FIGS. 2A and 2B are diagrams each illustrating a link speed of each port which is included in a dual port switch used in the conventional Ethernet. Hereinafter, a conventional communication method using a dual port switch will be described in detail with reference to FIGS. 1, 2A, and 2B.

Referring to FIG. 1, first and second dual port switches (Ethernet media access control (MAC) Switches) 1 and 2 transmit a packet based on a destination address (MAC address) of the packet.

For example, a packet received at a port 1 of the first dual port switch 1 is sequentially transmitted via a port 2 of the first dual port switch, a port 1 of the second dual port switch 2, and a port 2 of the second dual port switch 2.

To improve a transmission speed of the packet, a cut-through packet switching scheme is used. More particularly, the cut-through packet switching scheme is a scheme in which a dual port switch checks only a header frame of a packet and then immediately transmits the remaining frames of the packet to a destination.

In other words, the cut-through packet switching scheme obtains a MAC address by referring to only a header frame of a packet before all frames configuring the packet are received, and then immediately transmits the remaining frames configuring the packet to the obtained MAC address, thereby minimizing a switching delay.

However, in order to use the cut-through packet switching scheme, a link speed of a receiving port of a dual port switch should be equal to that of a transmitting port of the dual port switch. Referring to FIG. 2A, a dual port switch (Ethernet MAC Switch) includes a receiving port 1 and a transmitting port 2.

At this point, when link speeds of the receiving port 1 and the transmitting port 2 are the same as 100 mega bit per second (Mbps), a packet received through the receiving port 1 may be transmitted through the transmitting port 2 without data loss or data distortion.

However, as shown in FIG. 2B, a link speed of the receiving port 1 may be 1 giga bit per second (Gbps), while a link speed of the transmitting port 2 may be 100 Mbps. In this case, since a packet received at a high speed cannot be transmitted at the same speed, there is a problem in that data is overwritten or distorted.

Contrarily, a link speed of the receiving port 2 may be 100 Mbps, while a link speed of the transmitting port 1 may be 1 Gbps. In this case, since a packet received at a low speed is transmitted at a high speed, there is a problem in that data is repeated or insignificant data is inserted.

Therefore, according to the conventional method, the real-time Ethernet should be configured by fixing link speeds of ports to the same speed, the ports being included in all dual port switches. However, in a conventional link speed setting method, it is troublesome for a user to individually set link speeds of all ports configuring the real-time Ethernet.

Also, in the conventional link speed setting method, when a device supporting an improved speed is added to the existing real-time Ethernet, a compatibility problem due to a difference in link speed occurs, and thus a cut-through packet switching scheme does not operate normally.

SUMMARY

Therefore, it is an objective of the present disclosure to provide a method for setting a link speed of a dual port switch, which automatically controls link speed of ports, which are included in a dual port switch using a cut-through packet switching scheme, to be equal to each other, thereby being able to improve real-time performance in the Ethernet network communication.

Also, it is another objective of the present disclosure to provide a method for setting a link speed of a dual port switch, which controls a higher link speed of one of ports included in a dual port switch to be equal to a link speed of the other port of the ports, thereby being able to prevent a compatibility problem even though a device having a different physical characteristic is added to the Ethernet network.

In addition, it is still another objective of the present disclosure to provide a method for setting a link speed of a dual port switch, which changes a limited link speed used for auto negotiation to control a link speed of a port, thereby being able to set the link speed of the port in a simplified manner without modifying the existing Ethernet network communication environment.

Objectives of the present disclosure are not limited to the above described objectives, and other objectives and advantages of the present disclosure, which are not mentioned, can be understood by the following description and also will be apparently understood through embodiments of the present disclosure. It is also to be easily understood that the objectives and advantages of the present disclosure may be realized and attained by means and a combination thereof described in the appended claims.

In accordance with one aspect of the present disclosure, a method for setting a link speed of each of a first port and a second port, which are included in a dual port switch, according to the present disclosure includes receiving a link speed setting completion signal from each of the first port and the second port; when the link speed setting completion signals are received, determining a link speed of the first port and a link speed of the second port; comparing the determined link speed of the first port with the determined link speed of the second port; and when the link speed of the first port is higher than that of the second port, changing a limited link speed of the first port and controlling the link speed of the first port to be equal to that of the second port.

DETAILED DESCRIPTION

Figure 1:
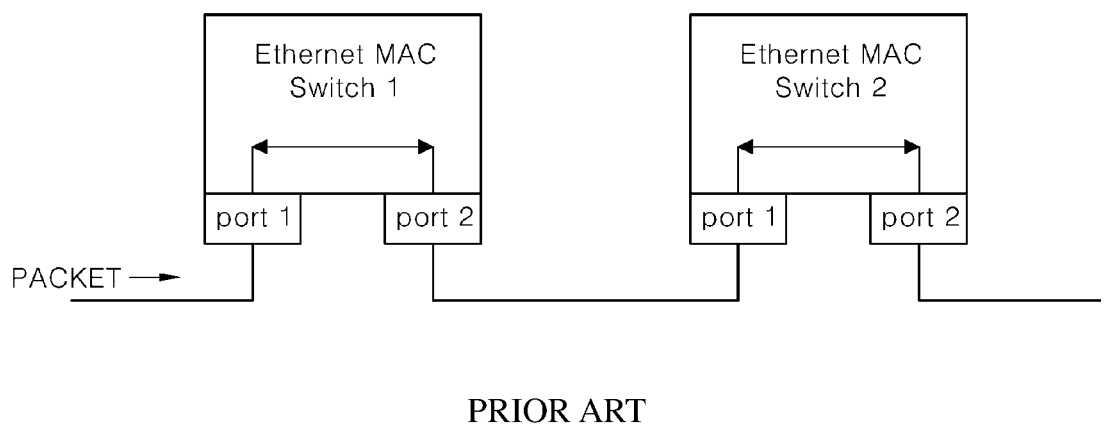
FIG. 1 is a diagram illustrating a connection state of dual port switches used in the conventional Ethernet.
Figure 2A:
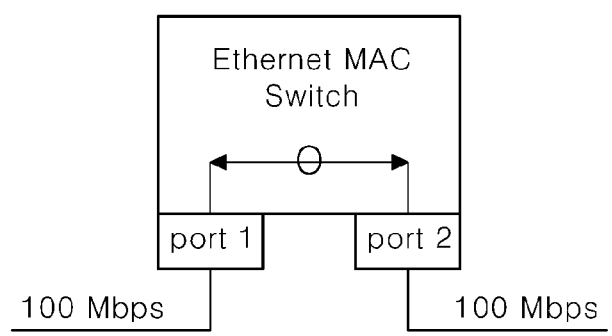
FIG. 2A and FIG. 2B are diagrams each illustrating link speeds of ports included in a dual port switch used in the conventional Ethernet.
Figure 2B:
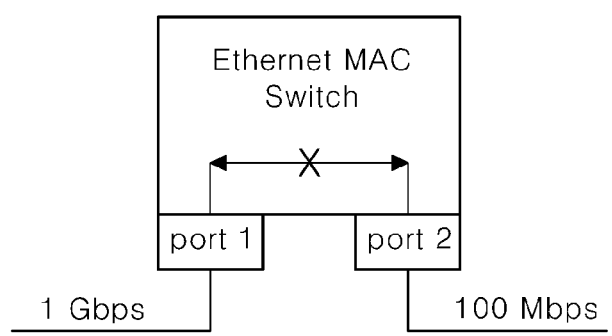

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

A method for setting a link speed of a dual port switch according to one embodiment of the present disclosure relates to a method for setting link speeds of a first port and a second port which are included in a dual port switch. In the present disclosure, a dual port switch may include a first port and a second port as a receiving port or a transmitting port, and may be included in the real-time Ethernet network configured to control individual processes in real time.

More particularly, the dual port switch may include a switch module configured to transmit a packet based on a destination address (a media access control (MAC) address) of the packet. For example, the dual port switch may be a switching hub configured to transmit a received packet to a particular node connected to the Ethernet network.

Meanwhile, in the present disclosure, the first port and the second port of the dual port switch may not refer to particular ports. In other words, any one port of dual port switch may be the first port and the other port thereof may be the second port.

The dual port switch according to one embodiment of the present disclosure may operate in a cut-through packet switching scheme. The cut-through packet switching scheme is a scheme in which a dual port switch checks only a header frame of a packet and then immediately transmits the remaining frames of the packet to a destination.

In other words, the cut-through packet switching scheme obtains the MAC address by referring to only a header frame of a packet before all frames configuring the packet are received, and then immediately transmits the remaining frames configuring the packet to the obtained MAC address, thereby minimizing a switching delay.

As described above, in order for the dual port switch to operate in the cut-through packet switching scheme, link speeds of ports configuring the dual port switch should be equal to each other.

Figure 3:
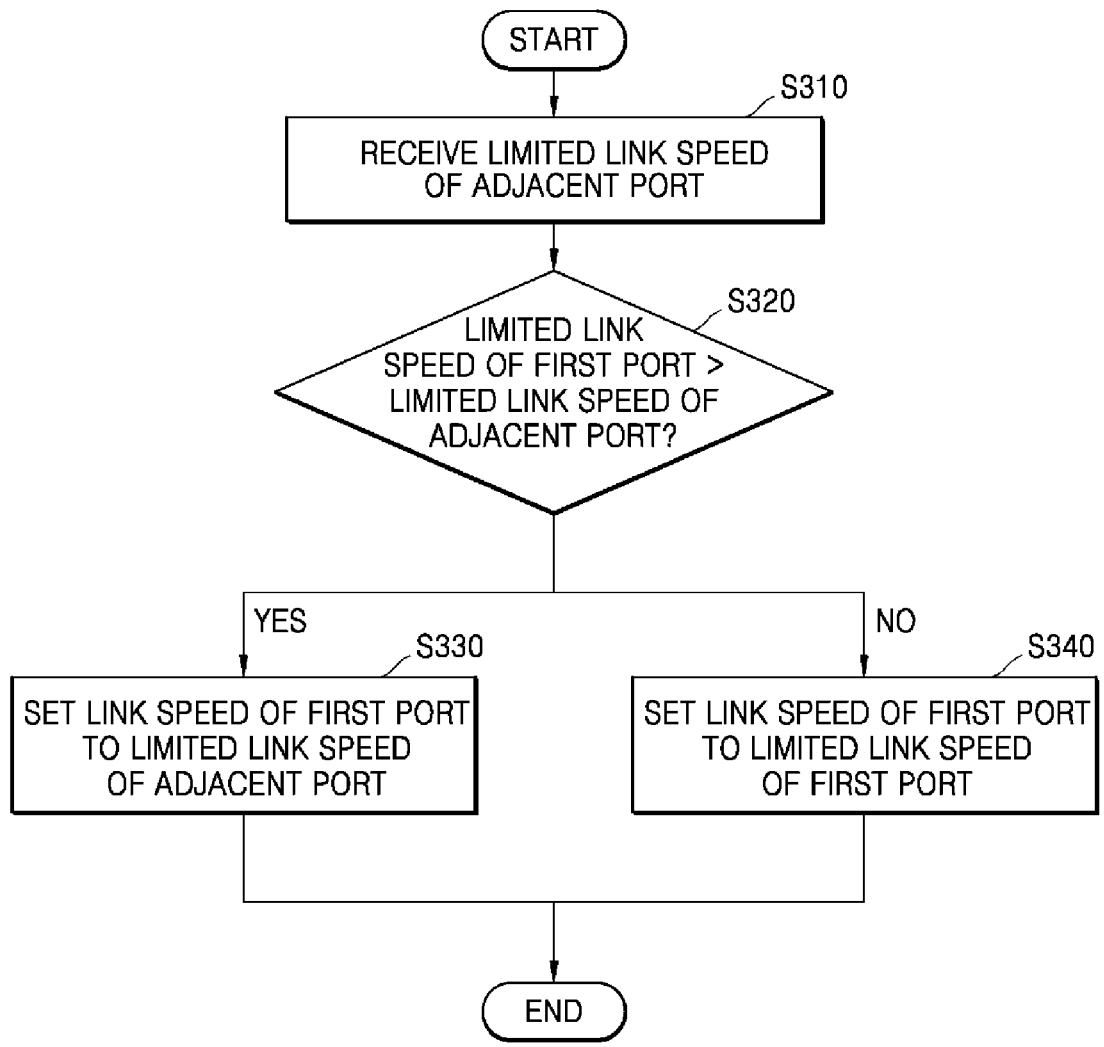
FIG. 3 is a flowchart illustrating a method for setting a link speed of each port by a dual port switch according to one embodiment of the present disclosure.
Figure 4:
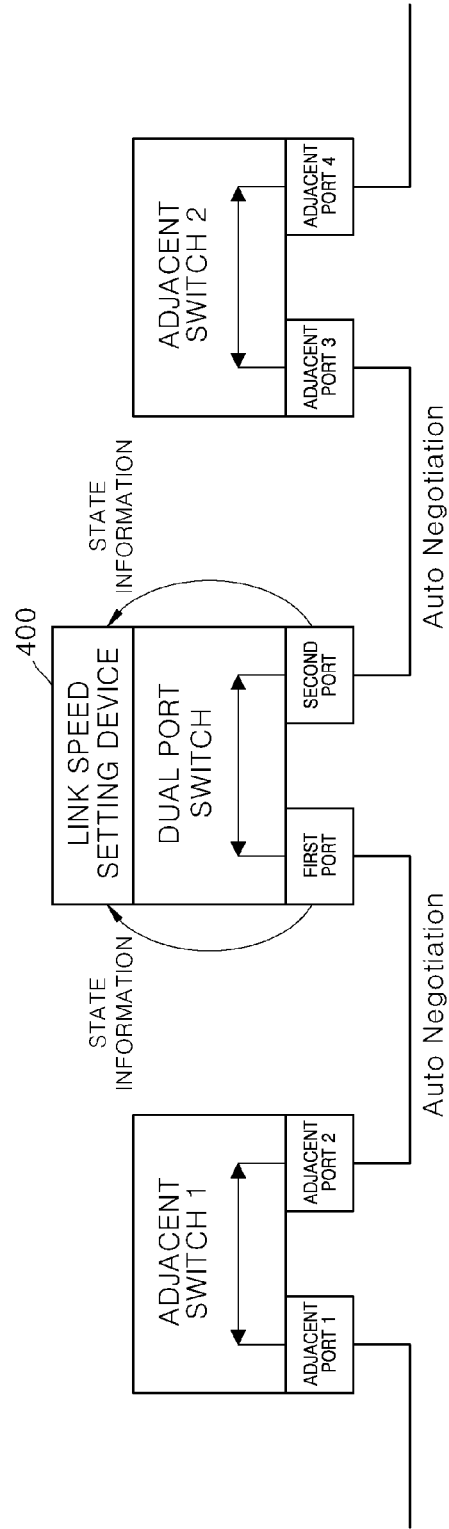
FIG. 4 is a diagram illustrating a connection state of a dual port switch according to one embodiment of the present disclosure.

FIG. 3 is a flowchart illustrating a method for setting a link speed of each port by the dual port switch according to one embodiment of the present disclosure. FIG. 4 is a diagram illustrating a connection state of the dual port switch according to one embodiment of the present disclosure. Hereinafter, the method for setting a link speed of each port by the dual port switch according to one embodiment of the present disclosure will be described in detail with reference to FIGS. 3 and 4.

Referring to FIGS. 3 and 4, a link speed of a first port included in the dual port switch may be set through data communication between the first port and an adjacent port connected to the first port. Also, a link speed of a second port included in the dual port switch may be set through data communication between the second port and an adjacent port connected to the second port.

More particularly, in FIG. 4, the dual port switch according to one embodiment of the present disclosure may perform data communication with an adjacent switch 1. Through such data communication, the dual port switch may receive data regarding a limited link speed of an adjacent port 2 from the adjacent switch 1 in operation S310.

Here, the limited link speed refers to a maximum link speed which is supported by a corresponding port. For example, the first and second ports included in the dual port switch may respectively support a link speed of maximum 100 mega bit per second (Mbps), and an adjacent port 1 and the adjacent port 2, which are included in the adjacent switch 1, may respectively support a link speed of maximum 1 giga bit per second (Gbps). In this case, a limited link speed of each of the first and second ports is 100 Mbps, and a limited link speed of each of the adjacent port 1 and the adjacent port 2 is 1 Gbps.

The dual port switch may determine that the limited link speed of the adjacent port 2 is 1 Gbps based on the data regarding the limited link speed of the adjacent port 2, which is received from the adjacent switch 1.

The dual port switch according to one embodiment of the present disclosure may compare a limited link speed of an adjacent port with the limited link speed of the first port in operation S320. As the comparison result in operation S320, when the limited link speed of the first port is higher than that of the adjacent port, the link speed of the first port may be set to the limited link speed of the adjacent port in operation S330. On the other hand, when the limited link speed of the first port is lower than that of the adjacent port, the link speed of the first port may be set to the limited link speed thereof in operation S340.

More particularly, in the above-described example, the dual port switch may compare the limited link speed (e.g., 1 Gbps) of the adjacent port 2 with the limited link speed (e.g., 100 Mbps) of the first port. Since the limited link speed of the adjacent port 2 is higher than that of the first port, the dual port switch may set the link speed of the first port to 100 Mbps that is the limited link speed of the first port.

In other words, the link speed of the first port may be set to a lower limited link speed among the limited link speed of the first port and the limited link speed of the adjacent port connected to the first port.

Meanwhile, in FIG. 4, the dual port switch according to one embodiment of the present disclosure may receive data regarding a limited link speed of an adjacent port 3 from an adjacent switch 2. A method for setting a link speed of the second port based on the data received from the adjacent switch 2 by the dual port switch is the same as that described above, and thus a description thereof will be omitted.

As a result, the link speed of the second port may also be set to a lower limited link speed among a limited link speed of the second port and a limited link speed of an adjacent port connected to the second port.

That is, a limited link speed of each port is one of physical characteristics of a corresponding port or a switch including that port, and each port may support a link speed that is lower than a limited link speed of each port, but may not support a link speed that is higher than the limit link speed thereof. Accordingly, the link speed of each port may be set to a highest link speed among link speeds which are supported by a corresponding port and a port in immediate proximity to the corresponding port.

As described above, an operation, in which all connected devices in a network connect to each other at a maximum speed that is supportable by the devices, is called auto negotiation. The link speeds of all the ports included in the dual port switch according to the present disclosure may be set by auto negotiation through communication with a port included in an adjacent switch.

Referring back to FIG. 4, the method for setting a link speed of a dual port switch according to one embodiment of the present disclosure may be performed inside a link speed setting device 400. The link speed setting device 400 may include a switching module configured to control a switching operation of a dual port switch. Alternatively, the switching module configured to control a switching operation of a dual port switch may be included within a dual port switch that is separated from the link speed setting device 400.

Figure 5:
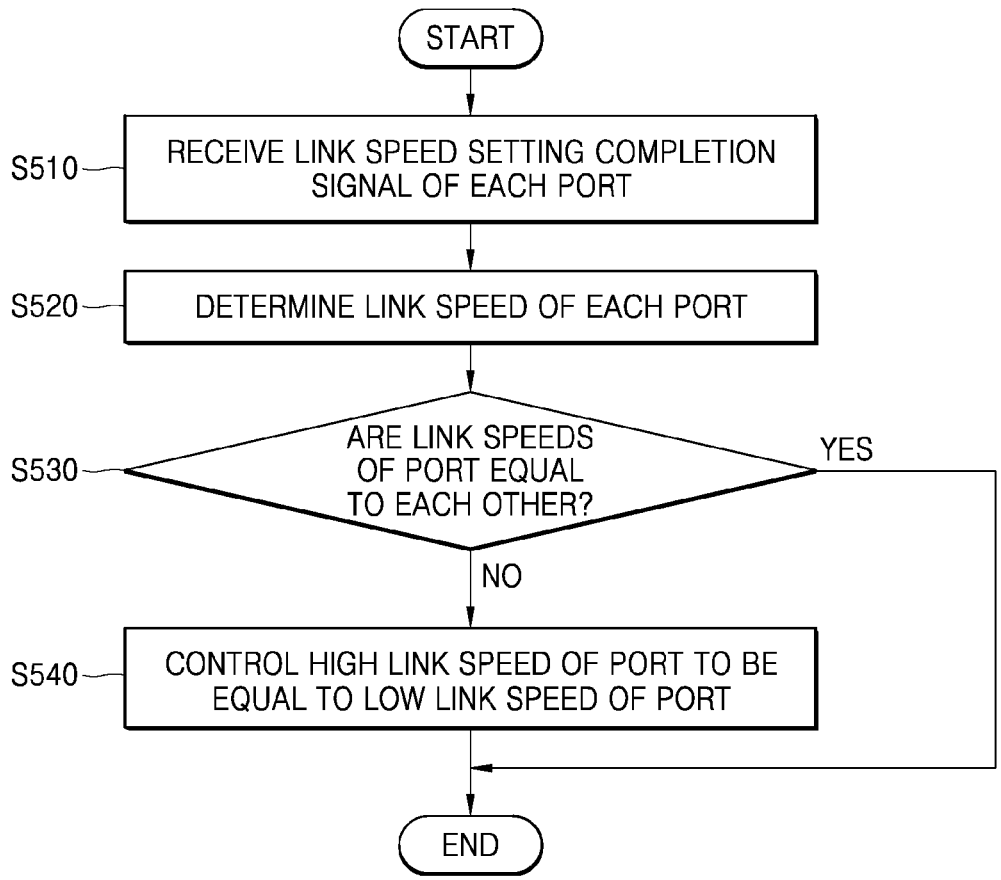
FIG. 5 is a flowchart illustrating a method for setting a link speed of a dual port switch according to one embodiment of the present disclosure.

FIG. 5 is a flowchart illustrating a method for setting a link speed of a dual port switch according to one embodiment of the present disclosure. Referring to FIGS. 4 and 5, the link speed setting device 400 according to one embodiment of the present disclosure may receive a link speed setting completion signal from each of the first port and the second port in operation S510.

More particularly, when a link speed of the first port and the link speed of the second port are set, the link speed setting device 400 may receive the link speed setting completion signal from each of the first port and the second port.

As described in FIG. 3, the link speed of each of the first and second ports included in the dual port switch may be set through auto negotiation with the adjacent switch. When the link speed of each of the first and second ports is set, each of the first and second ports may transmit the link speed setting completion signal to the link speed setting device 400.

In other words, when each of the first and second ports is linked up to an adjacent port and the link speed of each thereof is set through auto negotiation, the link speed setting completion signal may be generated by each of the first and second ports.

When receiving the link speed setting completion signals, the link speed setting device 400 may determine the link speed of the first port and the link speed of the second port in operation S520, and may compare whether the link speed of the first port is the same as that of the second port in operation S530.

More particularly, when receiving the link speed setting completion signals, the link speed setting device 400 may request state information to the first and second ports. In response to the request, each of the first port and the second port may transmit its own state information to the link speed setting device 400.

The status information may include physical characteristics such as a name of a corresponding port, an address thereof, a model thereof, a connection state thereof, a link speed thereof, and the like, and the link speed setting device 400 may determine the link speed of the first port and the link speed of the second port by referring to the received state information of each of the first and second ports. When the link speed of each of the first and second ports is determined, the link speed setting device 400 may compare with the link speeds of the first and second ports.

As the comparison result in operation S530, when the link speed of the first port is higher than that of the second port, the link speed setting device 400 may change the limited link speed of the first port to control the link speed of the first port to be equal to that of the second port in operation S540. Meanwhile, when the link speed of the first port is equal to that of the second port, the link speed setting device 400 may not control the link speed of the first port.

Referring back to FIG. 4, the limited link speed of each of the first and second ports included in the dual port switch of the present disclosure may be 1 Gbps. Also, the limit link speed of each of the adjacent ports 1 and 2 included in the adjacent switch 1 may be 1 Gbps, and the limited link speed of each of the adjacent ports 3 and 4 included in the adjacent switch 2 may be 100 Mbps.

At this point, as described in FIG. 3, the first port may perform auto negotiation with the adjacent port 2 of the adjacent switch 1. Accordingly, the link speed of the first port may be set to 1 Gbps that is a maximum link speed which is supportable by the first port and the adjacent port 2. In addition, the second port may perform auto negotiation with the adjacent port 3 of the adjacent switch 2. Accordingly, the link speed of the second port may be set to 100 Mbps that is a maximum link speed which is supportable by the second port and the adjacent port 3.

The link speed setting device 400 may receive the state information of each of the first and second ports and may compare with the link speeds which are respectively set to the first and second ports. In the above-described example, since the link speed (e.g., 1 Gbps) of the first port is higher than that (e.g., 100 Mbps) of the second port, the link speed setting device 400 may control the link speed of the first port to be equal to that of the second port.

Figure 6:
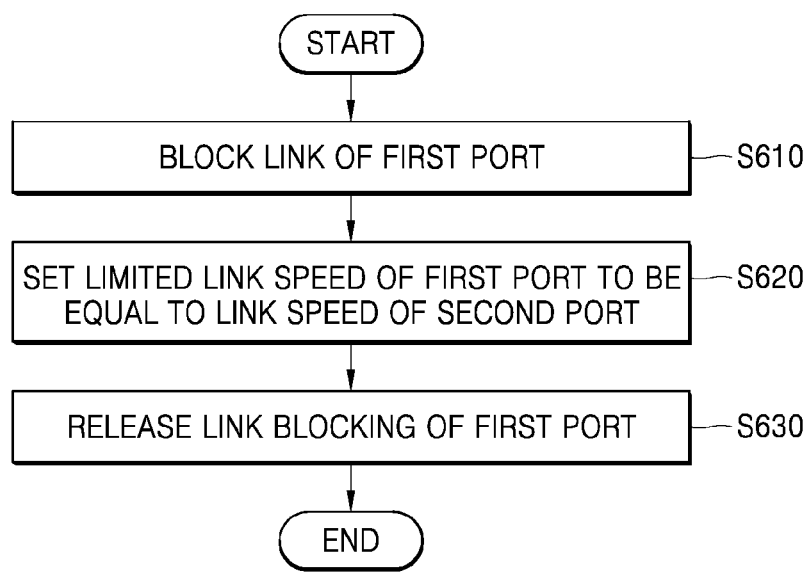
FIG. 6 is a flowchart illustrating a method for controlling a link speed of a port according to one embodiment of the present disclosure.

FIG. 6 is a flowchart illustrating a method for controlling a link speed of a port according to one embodiment of the present disclosure. Hereinafter, referring to FIGS. 4 and 6, it will be described in detail that the link speed setting device 400 of the present disclosure changes the limited link speed of the first port to control the link speed of the first port to be equal to that of the second port.

Referring to FIGS. 4 and 6, when the link speed of the first port is higher than that of the second port, the link speed setting device 400 of the present disclosure may block a link of the first port in operation S610. More particularly, the link speed setting device 400 may link down to the link of the first port to block the first port to perform the auto negotiation with the adjacent port 2.

When the link of the first port is linked down, the link speed setting device 400 may set the limited link speed of the first port to be equal to the link speed of the second port in operation S620. More particularly, after resetting the first port, the link speed setting device 400 may set the limited link speed of the first port to be equal to the link speed of the second port. In other words, in the above-described example, the link speed setting device 400 may forcibly set the limited link speed of the first port, which was previously set to 1 Gbps, to 100 Mbps that is the link speed of the second port.

When the limited link speed of the first port is forcibly set, the link speed setting device 400 may release the link down of the first port in operation S630, and thus the first port may be linked up again to the adjacent port 2.

In FIG. 4, since the first port and the adjacent port 2 may perform again the auto negotiation therebetween and the limited link speed of the first port is forcibly set to 100 Mbps, the link speed of the first port may be set to 100 Mbps that is the maximum speed which is supportable by the first port and the adjacent port 2. As a result, the limited link speed of the first port is changed such that the link speed of the first port may be controlled to be equal to that of the second port.

That is, according to the present disclosure, when a link speed of each port configuring the dual port switch is determined through auto negotiation with an adjacent switch, after a link with the adjacent switch is linked down, a relatively high link speed of a port can be forcibly changed to a relatively slow link speed of a port.

Accordingly, even when the auto negotiation is performed through each port after the link down is released, the link speeds of the ports can be kept at the same speed.

As described above, the first and second ports shown in FIG. 4 do not refer to particular ports, and any one of the ports included in the dual port switch may be the first port and the other port thereof may be the second port.

Further, in FIG. 4, the adjacent switch 1 and the adjacent switch 2 are described as the different names from the dual port switch, but they may be the same switch as the dual port switch of the present disclosure.

As described above, the present disclosure controls the link speed of the port by changing the limited link speed used for the auto negotiation, thereby being able to set the link speed of the port in a simplified manner without modifying the existing Ethernet network communication environment.

In addition, the present disclosure controls a higher link speed of one of ports included in a dual port switch to be equal to a link speed of the other port of the ports, thereby being able to prevent a compatibility problem even though a device having a different physical characteristic is added to the Ethernet network.

As a result, the present disclosure automatically controls the link speeds of the ports, which are included in the dual port switch using the cut-through packet switching scheme, to be equal to each other, thereby being able to improve real-time performance in the Ethernet network communication.

As described above, according to the present disclosure, the link speeds of the ports included in the dual port switch using the cut-through packet switching scheme are automatically controlled to be equal to each other, so that there is an effect in which real time performance in the Ethernet network communication can be improved.

In addition, according to the present disclosure, a higher link speed of one of ports included in a dual port switch is controlled to be equal to a link speed of the other port of the ports, so that there is an effect in which a compatibility problem can be prevented even though a device having a different physical characteristic is added to the Ethernet network.

Further, according to the present disclosure, the link speed of the port is controlled by changing the limited link speed used for auto negotiation, so that the link speed of the port can be set in a simplified manner without modifying the existing Ethernet network communication environment.

The present disclosure described above may be variously substituted, altered, and modified by those skilled in the art to which the present disclosure pertains without departing from the scope and spirit of the present disclosure. Therefore, the present disclosure is not limited to the above-mentioned exemplary embodiments and the accompanying drawings.

What is claimed is:

1. A method for setting a link speed of each of a first port and a second port, which are included in a dual port switch, comprising:
    receiving a first link speed setting completion signal from the first port when the link speed of the first port is set through auto negotiation with a first adjacent switch;
    receiving a second link speed setting completion signal from the second port when the link speed of the second port is set through the auto negotiation with a second adjacent switch;
    responsive to receiving the first and second link speed setting completion signals, requesting state information of each of the first port and the second port;
    determining a link speed of the first port and a link speed of the second port based on the state information of the first port and the second port;
    comparing the determined link speed of the first port with the determined link speed of the second port;
    blocking a link of the first port when the link speed of the first port is higher than that of the second port;
    changing a limited link speed of the first port to be equal to that of the second port;
    releasing the link of the first port; and
    responsive to releasing the link of the first port, performing the auto negotiation between the first port and the first adjacent switch again.

2. The method of claim 1, wherein the link speed of the first port is set through data communication between the first port and the first adjacent port connected to the first port, and the link speed of the second port is set through data communication between the second port and the second adjacent port connected to the second port.

3. The method of claim 1, wherein the link speed of the first port is set to a lower limited link speed among a limited link speed of the first port and a limited link speed of the first adjacent port connected to the first port, and the link speed of the second port is set to a lower limited link speed among a limited link speed of the second port and a limited link speed of the second adjacent port connected to the second port.

4. The method of claim 1, wherein the dual port switch operates in a cut-through packet switching scheme.

* * * * *